UNITED STATES PATENT OFFICE.

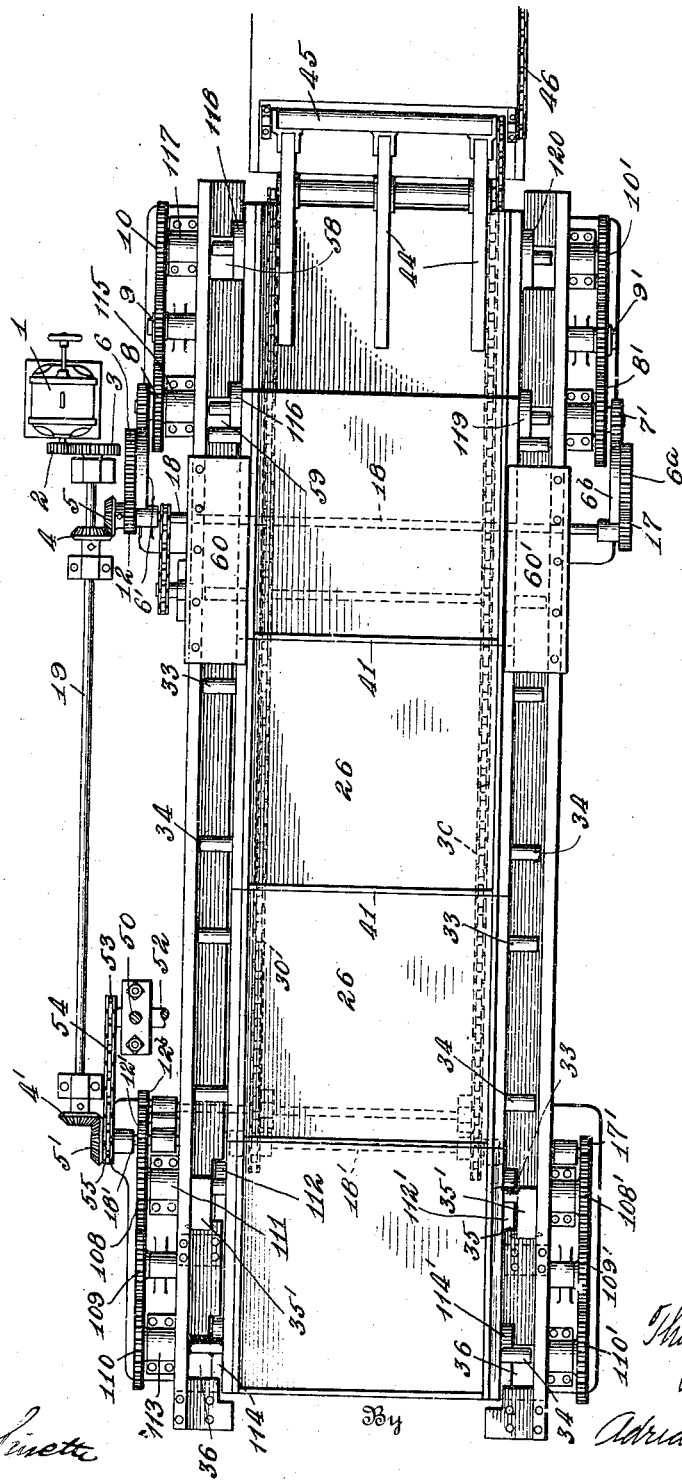

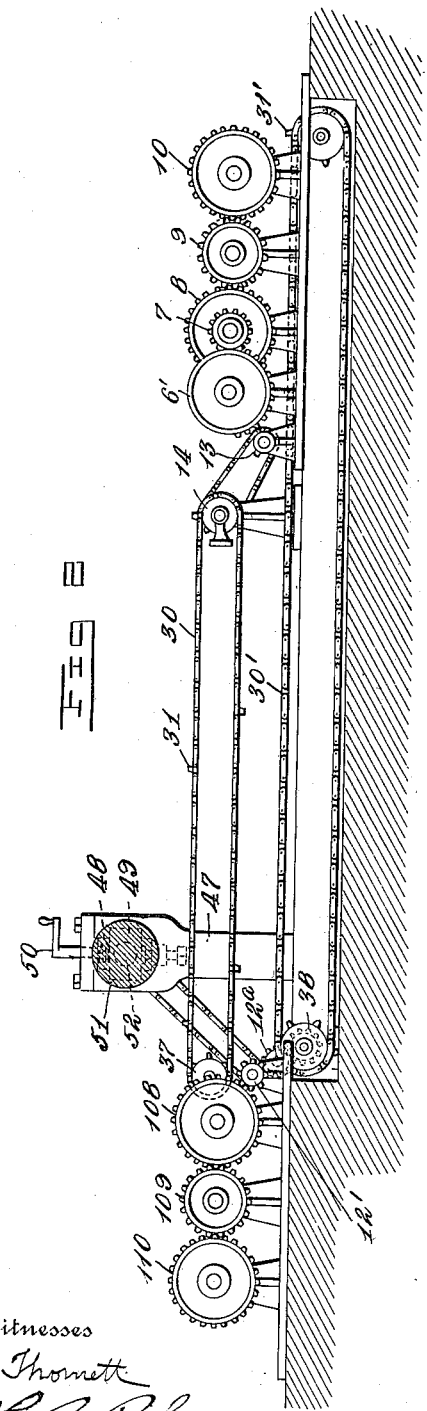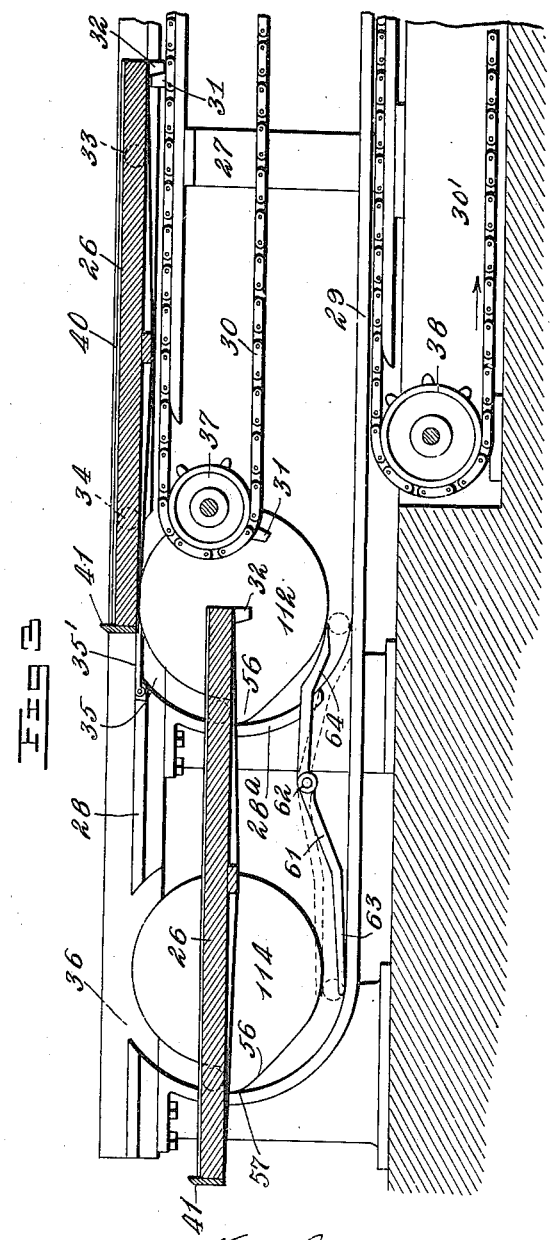

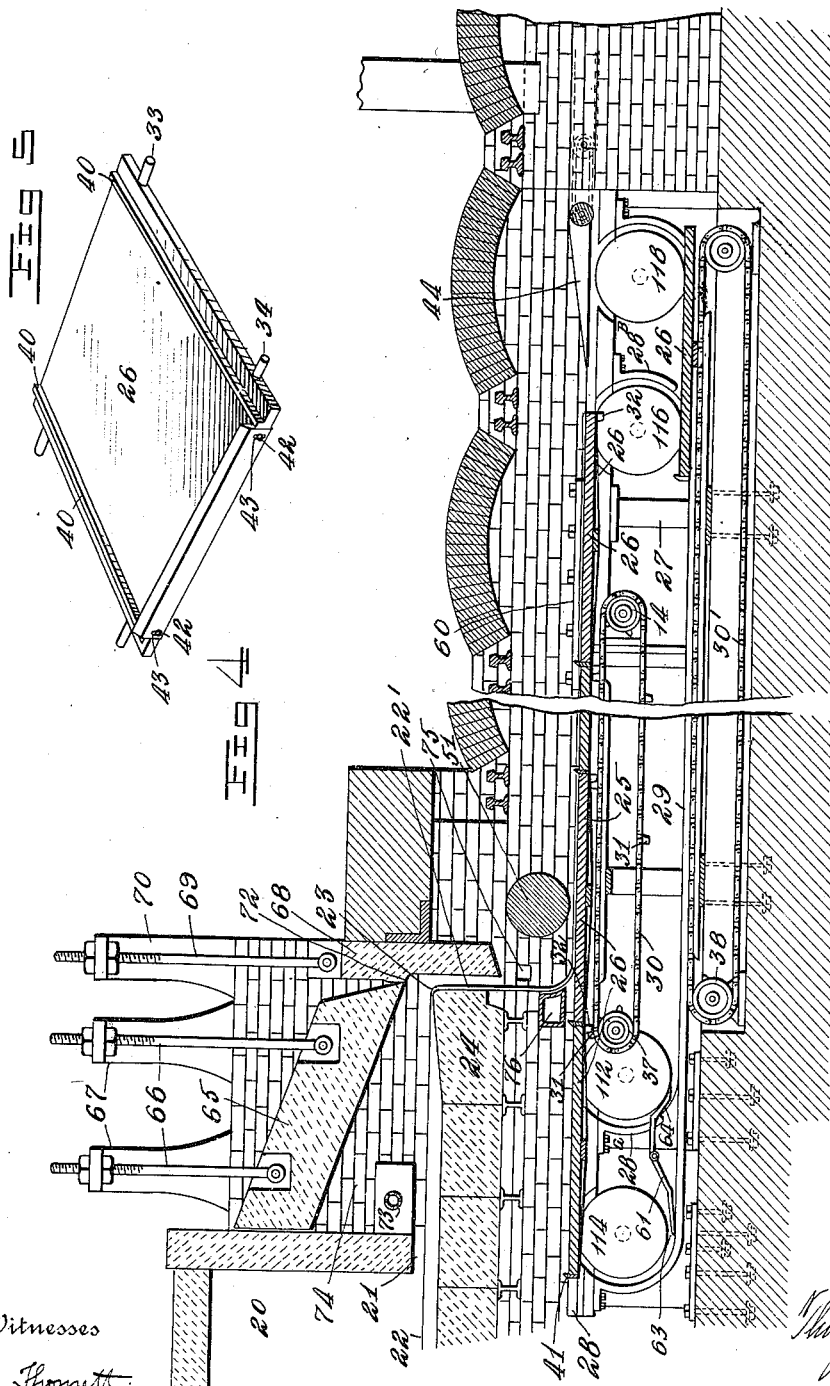

THOMAS J. McCOY, OF KANE, PENNSYLVANIA.

APPARATUS FOR GLASS MANUFACTURE.

1,282,254.

Specification of Letters Patent.

Patented Oct. 22, 1918.

Application filed July 27, 1914. Serial No. 853,292.

*To all whom it may concern:*

Be it known that I, THOMAS J. McCOY, a citizen of the United States, residing at Kane, in the county of McKean and State of Pennsylvania, have invented certain new and useful Improvements in Apparatus for Glass Manufacture, of which the following is a specification.

This invention relates to the art of continuously producing glass in sheet formation from a mass of molten glass, and more particularly it relates to an apparatus for flowing from a tank containing molten glass, a continuous ribbon of glass, depositing the same upon a suitable moving conveyer, severing it into suitable lengths while in a semi-plastic condition, and allowing it to fully congeal while in transit on the conveyer.

By the present invention it is rendered commercially practical to continuously produce sheet glass in the one operation, without undergoing the successive steps of subsequently re-heating, flattening, and annealing the glass, as is now the common practice. Furthermore, by this invention I am able to preserve to the surface of the glass the fire polish it acquires during the flowing operation, heretofore difficult of attainment where the surface of the glass while in a plastic or semi-plastic condition, is placed in contact with other substances.

In the use of my improved apparatus a suitable form of glass tank is provided which will allow for the continuous and uniform flow of the glass. A tank suitably constructed for these purposes is fully described and set forth in my prior application for Letters Patent serially numbered 652,780 filed on October 4, 1911. One of the advantages of the above form of tank resides in the ability to properly locate the conveyer mechanism in a position to handle the flow of glass as it emerges from the tank, as well as other advantages which will hereinafter be more fully set forth.

Many of the features of the invention may be used without employing all of them, as some of those which are non-essential may be omitted without departing from the spirit of the invention, though such omission may to a greater or less extent affect the quality of the product. Moreover, the apparatus portion of the invention is capable of receiving various mechanical expressions without departing from the spirit of the invention itself; and, for the purpose of describing the invention, there is illustrated in the accompanying drawings the preferred forms of apparatus, in which drawings:

Figure 1, is a plan view of the machine.

Fig. 2, is a longitudinal vertical section of the gearing and sprocket wheel and chain mechanism.

Fig. 3, is a longitudinal vertical section of one end of the machine with other portions broken away.

Fig. 4, is a longitudinal vertical section of the machine showing its relative position to the fragmentary part of the glass tank.

Fig. 5, is a perspective view of one of the tablets forming the conveyer.

In the drawings (Fig. 4) 20 represents the end portion of a glass tank having a suitable discharge opening 21, through which the glass 22, passes and overflows at the nose 23, of the apron stone 24 forming a thin glass ribbon 22'. As the glass leaves the nose of the apron stone 24, it descends by gravity in a vertical line and is deposited upon a continuously moving carrier 25, comprising a series of rectangular tablets 26, moving in a horizontal plane. The purposes and mode of operation of the carrier 25 will be hereinafter more fully described.

Located upon suitable standards 27, extending upwardly from the foundation upon which the conveyer apparatus rests, are two sets of horizontally disposed tracks 28 and 29, located in relative planes (Fig. 3). These tracks are so constructed that the tablets 26 are adapted to move on the tracks 28 comprising the upper plane in the one direction, and to move upon the tracks 29 comprising the lower plane in another direction. Movement is imparted to the tablets 26, by a moving sprocket chain 30. The chain 30, has at fixed intervals located on one of the links, an upwardly extending lug 31 which in passing over the sprocket wheel 37 engages the lug 32 extending downwardly from the tablet 26. By the movement of the sprocket chain 30, the tablet 26 moves therewith, in an outwardly direction from the tank 20, to a predetermined point along the track 28 where the lug 31 on the sprocket chain 30, is disengaged from the lug 32 on the tablet 26, by the diverting path of the sprocket chain passing over the wheel 14.

For the purposes of supporting the tablets 26, upon the track 28, the tablets 26 have extending outwardly from each of their edges moving parallel to the tracks 28, two dowel pins 33 and 34, which rest upon the tracks 28, and support the tablet 26, thereby.

The tracks 28 located in the upper plane have provisions made whereby the supporting dowel pins 33 pass upwardly through the apertures 35 in the tracks 28, and the dowel pins 34 likewise pass upwardly through apertures 36 and are admitted to and travel on the upper surface of the track 28. The apertures are so arranged that aperture 35 providing for the passage therethrough of the leading dowel 33, is provided with a hinged flap 35' or door which admits of upward movement when the dowel 33 comes in contact therewith, and allows the dowel 33 to pass upwardly through the aperture 35 carrying with it in its upward movement the flap 35' which after the forward movement of the dowel 33 will fall into a horizontal position in a relative plane with the track 28, and while resting in this position the dowel 34 will pass over the flap 35' and be supported thereby in passing over the aperture 35. By this arrangement as the plate 26 moves forward the following dowel 34 will pass over the aperture 35 without falling through due to the position of the flap 35' covering the aperture 35.

The location of the conveyer apparatus in respect to the tank containing the molten glass, is so arranged that as the molten glass overflows the rounded portion 23, of the apron stone 24, a ribbon of glass 22', will be formed by such overflow and pass downwardly to a point where it comes in contact with the polished surface of the tablet 26, of the conveyer mechanism. The distance from the rounded portion 23, of the apron stone 24, to the point of contact with the tablet 26, is of sufficient span to allow for the ribbon of glass 22' to assume a partially congealed state, and to acquire a sufficiently hardened finish to its surface to retain the fire polish essential to a perfect surface, throughout its subsequent contact with the surface of the conveyer tablets 26. To facilitate the maintenance of the desired fire polish, the tablets 26, are constructed from such metal or alloys as are susceptible of an exceedingly high polish, to the end that after the ribbon of glass 22' has traversed the span from the rounded nose 23, to the tablet 26, sufficient hardening has resulted in the surface of the ribbon of glass 22' that the high polish of the surface of the tablet 26, will not have any detrimental effect on the glass caused by its contact therewith.

Located above the apron stone 24, and adapted for vertical movement, is a cap stone 65, suspended by elevating screws 66, passing through standards 67. When in normal position, the cap stone 65, is hung in a slanting position, so that the end farthest from the main tank 20, is nearest to the apron stone 24. Located in close proximity to the cap stone 65, and also adapted for vertical movement, is the front stone 68, suspended by elevating screws 69 passing through standards 70. At a point about midway on the inner face of the front stone 68 is an off-set 72, the purposes of which is to provide for creating an aperture between the cap stone 65 and the front stone 68, by the slight raising of the front stone 68, or by the lowering of the cap stone 65.

Located under the plane of the inner end of the cap stone 65 is a fuel gas burner 73 extending into the chamber 74 under the cap stone 65. This burner provides additional heating means for the chamber 74.

To provide for observing the flow of glass by the operator, an aperture 75, is provided in the side wall in close proximity to the point where the glass is deposited upon the tablet 26.

To provide for applying cooling means to the surface of the ribbon of glass, before it is deposited upon the tablet 26, a water tank 76 adapted for the circulation of water therethrough, is placed near the path of travel of the glass.

The tablet 26 forming one of the portions of the movable carrier 25, is provided with upwardly extending flanges 40, near its side edges for the purposes of keeping the sheet of glass in proper position thereon. Each of the tablets 26 are provided with a beveled edge knife blade 41, adjustably secured along its rear edge by means of screws 42, threaded into the edge of the tablets 26, and slidable in vertically countersunk slots 43, of the knife blade. At the terminal point where the tablet 26, is lowered from the upper, to the lower plane of travel, are placed a number of lifting prongs 44, so arranged that as the tablet 26 carrying the sheet of glass thereon, reaches the point where it is about to be lowered, the lifting prongs 44, slip under the plate of glass and the plate being carried onward by its contact with the vertical projecting shoulder formed by the knife blade 41, pressing against the after edge thereof, the glass in its movement passes up the incline of the prongs 44, until it comes in contact with the roller 45, which continues the movement of the sheet. The roller 45 is covered with asbestos or other suitable material and is driven from any source of motive power by the sprocket chain 46. Any number of rollers 45 may be provided as may be found necessary to further convey the sheet of glass to any point desired.

Extending upwardly from the foundation upon each side of the conveyer mechanism, is a pair of standards 47, provided with an enlarged hollow head forming a housing 48, in which journal boxes 49, may be vertically adjusted by means of the crank screws 50, threaded in the upper part of said housing. The compression roller 51, is secured to the shaft 52, which is journaled in the boxes 49, and carries sprocket wheel 53, which is driven by sprocket chain 54, leading from the sprocket wheel 55, keyed to the shaft 18'. By means of the crank screws 50, the position of the roller 51, in relation to the plane of travel of glass, may readily be adjusted, so that when the sheet of glass which has been deposited on the tablet 26, passes over the edge of the knife blade 41, and moves forward to a point where the knife blade 41 passes under the compressing roller 51, the sheet of glass being in a semi-plastic condition will be severed by the roller 51 pressing the glass against the knife blade 41.

The movable carrier 25 comprising the plurality of tablets 26 derives its motion from a variable speed motor 1, which has attached to its armature shaft a drive pinion 2, which meshes into pinion 3. Pinion 3, drives shaft 19 on which the two miter gears 4—4' are securely keyed. The miter gears 4—4' transmit motion to their sister miter gears 5—5' which in turn transmit motion to the shafts 18—18'. Located on the shafts 18—18' are pinion gears 12—12'. Located on the opposite ends of the shafts 18—18' are pinion gears 17—17'. The pinion gear 12' meshes into spur gear 108. The idler 109 couples the spur gear 108 with the spur gear 110, and renders equal the movement and speed of the spur gears 108 and 110. Likewise the pinion gear 17' meshes with the spur gear 108'. The idler 109' connects the spur gear 108' and the spur gear 110' providing the same direction and speed of movement to spur gears 108' and 110'. Attached to the spur gear 108, is a stub shaft passing through journal 111, having on its inner end a disk 112, adapted to revolve in a vertical plane. Attached to the spur gear 110, is a stub shaft passing through the journal 113, having on its inner end the disk 114, adapted to revolve in a vertical plane. Similar stub shafts are connected to spur gears 108' and 110', and have at their inner ends similar disks 112' and 114', also adapted to revolve in a vertical plane.

Attached to the spur gear 8, is a stub shaft projecting through the journal 115, having on its inner end a disk 116, adapted to revolve in a vertical plane. Attached to spur gear 10, is a stub shaft projecting through the journal 117, having on its inner end a disk 118, adapted to revolve in a vertical plane. Similar stub shafts are connected to spur gears 8' and 10', and having at their inner ends similar disks 119 and 120 adapted to revolve in a vertical plane.

The tracks 29, are at their terminal ends, curved to form arc sections concentric with the circular portion of the revolving disks 114 and 118. Similar arc section guards 28$^a$ and 28$^b$, are placed in position concentric with the circular outline of the disks 112 and 116. These track portions and guards are adapted to guide the movement of the dowel pins 33 and 34 in their passage during the lowering and elevating movements of the tablet 26 from one track to the other.

To provide for the dowels 33 coming into suitable contact with the guards 28$^a$, so as to properly ride thereon, an elevating means is provided for automatically guiding the dowel 33 in its movement from the plane of the track 29 to the beginning of the arc of the guards 28$^a$. This guiding means comprises a lever 61, fulcrumed at 62, on a fixed standard attached to the foundation. The lever 61 is adapted for oscillating movement and is actuated by contact with the dowel 34 which in its movement along the track 29 engages the end 63 of the lever 61 and elevates the same to a point above the plane of movement of the dowel 34 thereby depressing the opposite end 64, of the oscillating lever 61 to a point below the line of travel of the dowel 33, and remains in such depressed position until the dowel 33 has passed to a point of contact with the guards 28$^a$.

To provide for the leading dowels 34 to pass the lever 61 without being elevated thereon, the lever 61 in its normal position is so balanced that the curved end portion 64 is above the line of travel of the dowel pins 34.

The disks 112, 114, 112', 114', 116, 118, 119 and 120, are each provided with an eccentrically extended lip 56, having semi-circular pockets 57, located therein, and adapted to register with the dowel pins 34 and 33. The timing of the relative movement of each set of revolving disks, is so arranged that the four dowels extending from the plate 26, will simultaneously be pocketed in the semi-circular pockets 57, and as the disks revolve in their synchronizing movement, the plate 26, will be maintained in a horizontal position, and pass from one to the other of the upper and lower tracks.

Referring to Fig. 2, the pinion gear 12' meshes with the small idler 12$^a$, which in turn meshes with the spur gear 12$^b$, (Fig. 1), which is connected to the shaft upon which is keyed the sprocket 38. The sprocket wheel 38 engages and imparts movement to the sprocket chain 30', in the direction of the arrow. (Fig. 3).

For the purposes of arranging for the proper timing of the movement of the plates 26, the movement of the operative means is such, that the shaft 18, on which the miter gear 5 is attached revolves, the spur gear 12 revolving therewith, and meshing with the spur gear 6. Located on the same spindle as the spur gear 6, and keyed fast thereto, is an intermittent driving wheel 6' having teeth only on one half of its circumference. The spur gear 17 revolving with the shaft 18, meshes with spur gear 6ª. Located on the same spindle as the spur gear 6ª, and keyed fast thereto, is an intermittent driving wheel 6ᵇ, having teeth on one half of its circumference. The intermittent driving wheel 6', engages the teeth of the spur gear 7. Likewise the intermittent driving wheel 6ᵇ, engages the teeth of the spur gear 7'. When the teeth of the intermittent driving wheel 6', and 6ᵇ, come around, and mesh with the teeth on the spur gear 7, and 7' they cause the spur gears 7—7' to make one revolution and then disengage themselves from the intermittent driving wheels 6' and 6ᵇ, respectively, thereby causing the spur gears 7—7' to remain stationary during the other half of the revolution of the spur gears 6 and 6ª.

At this period of rest, of the spur gears 7—7', the timing of the parts of the machine in relation to each other, is arranged so that the disks 116, 118, 119 and 120, are in such positions that the dowels 33 and 34, will engage the semi-circular pockets 57 of lips 56, as the plate 26 is moved to the point on the track 28, where the dowels 33 and 34, will pass through the apertures 58 and 59, in the tracks 28. With the plate 26 in this position, as the intermittent driving wheels 6' and 6ᵇ again engaged in their rotation the teeth of the spur gears 7—7', the pinion gears 8 and 10 and 8' and 10' will begin to revolve, turning in their revolutions the disks 116, 118, and 119 and 120, carrying with them in their movement the tablet 26, and depositing it on the lower track 29, where it is carried along by the projecting lug 31' on the sprocket chain 30' engaging the lug 32, on the tablet 26 by which engagement the tablet 26 will be carried along the track 29, until it reaches a position at the other end of the path of the chain 30' where it is placed in a position to be lifted by the disks 112—114 and 112'—114' which in their revolution will engage dowels 33 and 34 in their semi-circular pockets 57, placed in the eccentrically extended lips 56, whereby the plate 26, will be elevated from the lower plane, to the upper plane, by the passing of the dowels 33 and 34 through the apertures 35 and 36, of the track 28, whence the plate 26 will be carried along by the contact of the lug 31, on the sprocket chain 30, with the lug 32 located on the under side of the tablet 26.

This operation, the movement of the table plate 26, in one direction in an upper horizontal plane and then automatically transferring the plate from upper horizontal plane to the lower horizontal plane and conveying movement to the plate 26, in the opposite direction is repeated continuously while the machine is in motion.

In operation the supply of glass 22 in the tank 20, is given the proper flowing temperature to provide for its free overflow at the rounded nose 23 of the apron stone 24. The motor 1, is placed in circuit with any source of electrical power, which sets the conveyer mechanism in motion, causing the upper links of the sprocket chain 30, to move outwardly from the tank 20, conveying movement to the tablets 26, comprising the horizontal carrier 25. The relative movement of the tablets 26, is so fixed in relation to the speed of the overflow of the ribbon of glass 22', that the glass will be deposited on the tablets 26, in a uniform layer. As the ribbon of glass 22', in its depositing operation, passes from one of the tablets 26 to the next succeeding tablet forming the horizontal conveyer, the ribbon of glass is slightly elevated by the upwardly projecting beveled edge knife 41, and remains in this elevated position at this point, until the tablet 26, carrying the knife 41, at its after end, passes under the compression roller 51. The roller 51 is so adjusted as to cause the periphery thereof to come in close contact with the upper edge of the beveled knife 41, which automatically severs the ribbon of glass at that point. Each succeeding tablet being likewise provided with an elevated beveled edge knife on its after end, the ribbon of glass is likewise severed as the knife passes under the roller 51.

As the tablets 26, after passing the compression roller 51, continue on in their movement, the sheet of glass deposited thereon, continues to congeal, until having reached the outer point in the movement of the conveyer away from the tank, the sheet of glass is automatically picked up from the tablet 26, by the projecting prongs 44, and the sheet is caused to move upwardly thereon, until the forward edge of the sheet comes in frictional contact with the roller 45, which being in rotation, continues to carry the sheet onward to its point of destination.

Located above the tracks 28 near the end of the point of travel thereon of the tablet 26 are a pair of guide slides 60—60' under which the edges of the tablet 26 pass in close contact. As the tablet 26 moves toward its farthermost position away from the tank, the dowel 33 in passing over the aperture 59, in the track 28, is prevented from dropping through the aperture 59 by the guiding effect of the slides 60—60', holding the after end of the tablet 26, in alinement with the track 28 until dowel pin 33 has passed over the aperture 59. As the tablet 26 reaches the farthermost position in its travel away from the tank, the dowels 33 and 34 register with apertures in the track 28, and are lowered therethrough to be pocketed in the eccentrically located projections of the revolving disks, which are in turn placed in operation by the engagement of the intermittent gears 6' and 6ᵇ, with the revolving mechanism operating the disks.

After revolving disks 116, 119 and 118 and 120, make a half revolution and deposit the tablet 26 on the lower tracks 29, the sprocket chain 30' conveys movement to the tablet 26, in the direction toward the tank at such increased speed as will place the tablet 26 in proper position to be elevated from the lower track 29, to the upper track 28 by the revolving disks 112, 112' and 114 and 114' in time to follow the preceding tablet 26 of the movable conveyer 25 in such relation that their contiguous edges will be in close contact. In this manner there will be a continuous moving conveyer 25 adapted to take care of the ribbon of glass 22' as fast as it overflows from the rounded nose 23 of the discharge end of the tank.

Having thus described my invention, what I claim and desire to secure by Letters Patent is:

1. An apparatus of the character described comprising a glass tank having a discharge opening at one end, a horizontal conveyer located under the glass discharge opening comprising a plurality of rectangular tablets, a track adapted for movement of the tablets thereon in one direction, a second track located below the plane of the first track adapted for movement of the tablets thereon in opposite direction with means including a pivoted member and rotary members for automatically changing the line of travel of the tablets from one track to the other and an independent conveyer coöperating with the lower track, said rotary members comprising disks each having an offset on its edge portion engaging the tablets, the offsets on the several disks being maintained in corresponding positions during rotation.

2. In an apparatus of the character described, the combination of an upper and lower track, movable planes having extended lugs engaging the upper surface of said tracks and slidably mounted thereon, means for shifting the planes from the upper to the lower track, means for moving the planes along the lower track, independent means for elevating the planes from the lower to the upper track and including members engaged and operated by certain of the lugs for guiding others of said lugs, with means for moving the planes along the upper track and means for depositing a continuous ribbon of glass on the planes during their movement along the upper track, said moving and lifting means being structurally independent of the planes.

3. In an apparatus of the character described, the combination with an upper and a lower track, a horizontal conveyer having two extended lugs engaging the tracks on each side, operatively mounted for movement thereon, a pair of drive shafts extended across the track, gear wheels driven by each drive shaft, stub shafts journaled outside of the tracks and driven from the gear wheels, revolving disks on the inner end of the stud shafts having extended portions in their periphery provided with pockets and operating to engage and carry the extended lugs on the conveyer in their rotative movement, means including a balanced lever automatically thrown from its balanced position for diverting the path of the extended lugs from a horizontal movement along said lower track, and means for depositing a continuous ribbon of glass on said conveyer, substantially as described.

4. An apparatus of the character described, comprising a tank containing molten glass having an overflow spout for the continuous discharge of glass therefrom, means for controlling the temperature of glass passing over said spout, an upper and a lower track extending under the overflow spout, movable planes operatively mounted for horizontal movement on said tracks and means for shifting the planes from one track to the other and maintaining them in a horizontal position, said means last mentioned including disk members each carrying an offset directly supporting the planes and shifting them from one track to the other, and conveying means structurally independent of the shifting means.

5. An apparatus of the character described, comprising a tank containing molten glass, an overflow spout connected to said tank, walls extending upwardly on each side of said spout, an inclined cover member adapted for vertical movement located between said side walls and over said spout, a movable front wall located between said side walls in normal contact with said cover member, and means for varying the inclination of the cover member for creating an air space between said front wall and the cover member, substantially as described.

6. An apparatus of the character described, comprising a tank containing molten glass, an overflow spout connected to said tank located below the normal glass level in said tank, walls extended upwardly on each side of said spout, a cover member adapted for vertical movement located betwen said side walls and over said spout, a movable front wall located between said side walls and having a lateral offset in normal contact with said cover member, means for adjusting the cover for creating an air space between said front wall and the cover member, a horizontal conveyer located below the overflow spout, and adapted to receive and convey the discharge from said overflow spout, and means for imparting motion to said conveyer, substantially as described.

In testimony whereof I have affixed my signature in presence of two witnesses.

THOMAS J. McCOY.

Witnesses:
C. B. GILLIS,
PEARLE JONES.